United States Patent
Coombs

(10) Patent No.: US 6,749,048 B2
(45) Date of Patent: Jun. 15, 2004

(54) FLUID SEAL ASSEMBLY FOR A PRESSURED SYSTEM

(75) Inventor: Joshua D. Coombs, Whitmore Lake, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/224,112

(22) Filed: Aug. 20, 2002

(65) Prior Publication Data

US 2004/0035660 A1 Feb. 26, 2004

(51) Int. Cl.$^7$ .................................................. F16F 9/36
(52) U.S. Cl. .................................. 188/322.17; 277/919
(58) Field of Search ................................ 277/301, 549, 277/553, 919; 188/266.7, 322.16, 322.17; 384/1

(56) References Cited

U.S. PATENT DOCUMENTS

| | | |
|---|---|---|
| 4,643,437 A | 2/1987 | Salant et al. |
| 4,691,276 A | 9/1987 | Miller et al. |
| 4,729,459 A * | 3/1988 | Inagaki et al. ........... 188/266.5 |
| 4,741,416 A * | 5/1988 | Tanigawa ................ 188/266.7 |
| 5,014,829 A | 5/1991 | Hare, Sr. |
| 5,105,918 A | 4/1992 | Hagiwara et al. |
| 5,246,235 A | 9/1993 | Heinzen |
| 5,277,281 A | 1/1994 | Carlson et al. |
| 5,540,448 A | 7/1996 | Heinzen |
| 5,878,851 A | 3/1999 | Carlson et al. |
| 6,003,872 A | 12/1999 | Nord |
| 6,142,477 A | 11/2000 | Meinzer |
| 6,318,521 B1 | 11/2001 | Niaura et al. |

* cited by examiner

*Primary Examiner*—Jack Lavinder
*Assistant Examiner*—Xuan Lan Nguyen
(74) *Attorney, Agent, or Firm*—Brinks Hofer Gilson & Lione

(57) ABSTRACT

The present invention involves a fluid seal assembly of a pressured system for reducing static friction on a displacement rod of the pressured system. The assembly comprises a sealing member disposed on a surface of the pressured system. The sealing member is in circumferential engagement about the displacement rod to define a radial preload on the displacement rod forming a static friction thereon. The assembly further comprises an actuator attached to the sealing member and being configured to bend when the electric input is applied thereacross to displace the sealing member from the displacement rod for reducing the static friction on the displacement rod when the displacement rod move from a stagnant position within the pressured system.

10 Claims, 3 Drawing Sheets

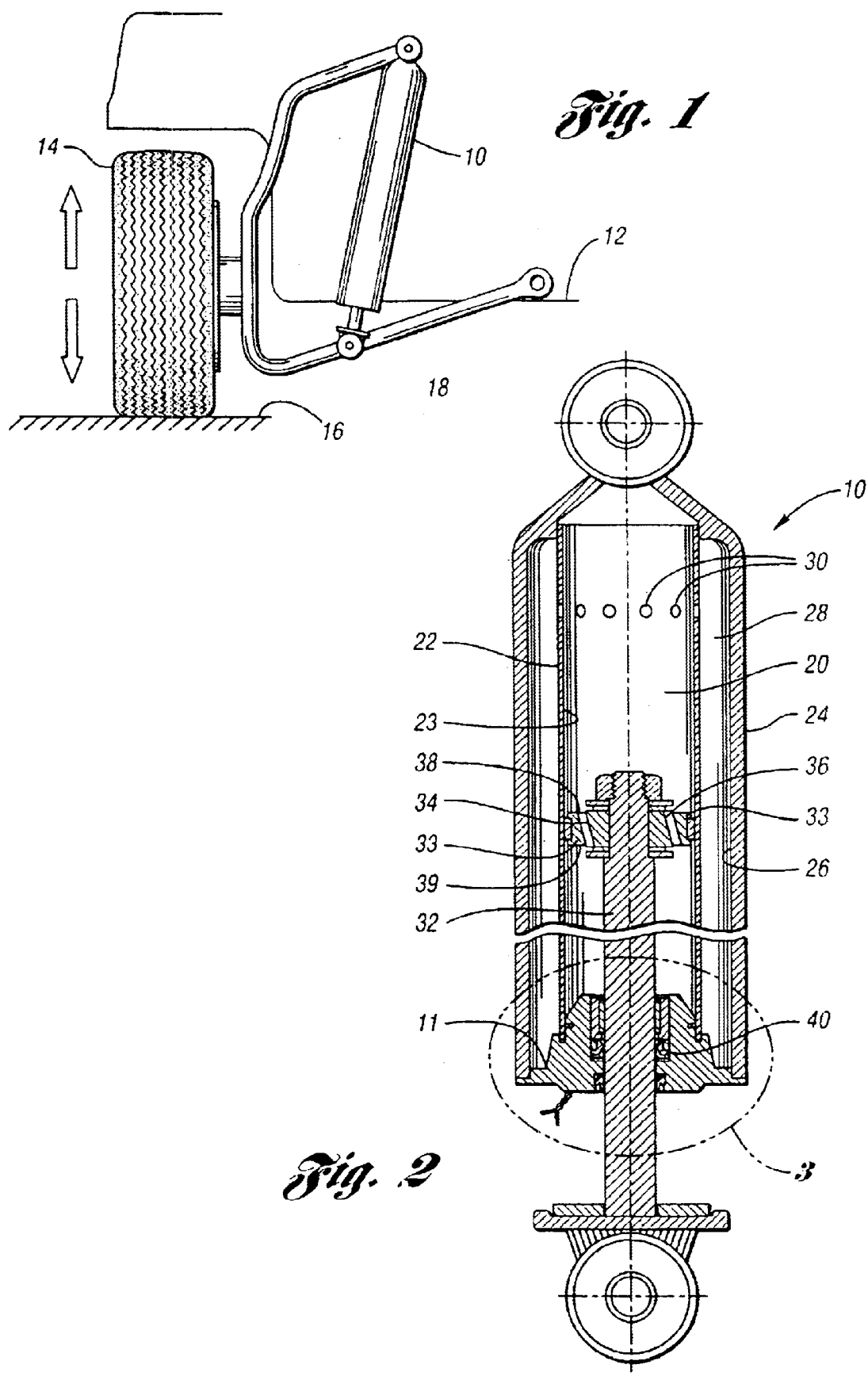

FLUID SEAL ASSEMBLY FOR A PRESSURED SYSTEM

CROSS-REFERENCE TO RELATED APPLICATIONS

The present invention is related to an international patent application having Patent Cooperation Treaty international application no. PCT/US01/48141, filed Dec. 7, 2001, entitled "Compression Fluid Strut," which claims priority to U.S. provisional application Serial No. 60/251,951, filed Dec. 7, 2000, entitled "Compressible Fluid Strut," both of which are hereby incorporated herein.

BACKGROUND OF THE INVENTION

The present invention relates to a fluid seal assembly of a pressured system for reducing static friction on a displacement rod of the pressured system.

Suspension systems in vehicles are known and are continuously improved for vehicle handling and ride comfort. Inherent in most conventional suspension struts is a compromise between at least vehicle ride comfort (the ability to isolate the vehicle from the road surface) and handling (the ability to resist roll of the vehicle). Pertaining to vehicle ride comfort, a suspension strut operates to provide dampening of a spring force toward the vehicle and toward the surface below the vehicle. However, manufacturers have been challenged with providing optimum damping of such spring forces when the vehicle is moving at relatively slow speeds, e.g., speeds less than 30 miles per hour. In many situations, high pressure within the suspension strut contributes to generate a high static friction and dynamic friction at the seal. This increases what is called ride harshness of the vehicle ride. Moreover, a seal which radially engages a displacement rod of the suspension strut contributes to the friction on the displacement rod. At low vehicle speeds, the friction between the seal and the displacement rod is relatively high resulting in undesirable ride harshness experienced by an occupant of the vehicle.

BRIEF SUMMARY OF THE INVENTION

Thus, it is one aspect of the present invention to provide a fluid seal assembly of a pressured system for reducing static friction on a displacement rod of the pressured system.

In one embodiment, the present invention provides a fluid seal assembly of a suspension strut for reducing static friction on a displacement rod of the suspension strut. The fluid seal assembly includes a sealing member disposed on a surface of the suspension strut. The sealing member is in circumferential engagement about the displacement rod to define a radial preload on the displacement rod contributing to a static friction thereon. The fluid seal assembly further includes an actuator attached to the seal member and configured to bend when an electric input is applied there across to displace the sealing member from the displacement rod for reducing the static friction on the displacement rod when the displacement rod move from a stagnant position the suspension strut.

Further objects, features and advantages of the invention will become apparent from consideration of the following description and the appended claims when taken in connection with the accompanying drawings.

BRIEF DESCRIPTION OF THE DRAWINGS

FIG. 1 is a front view of a suspension strut of a vehicle in accordance with one embodiment of the present invention;

FIG. 2 is a cross-sectional view of the suspension strut of FIG. 1 in accordance with one embodiment of the present invention;

DETAILED DESCRIPTION OF THE INVENTION

Figure 3A:
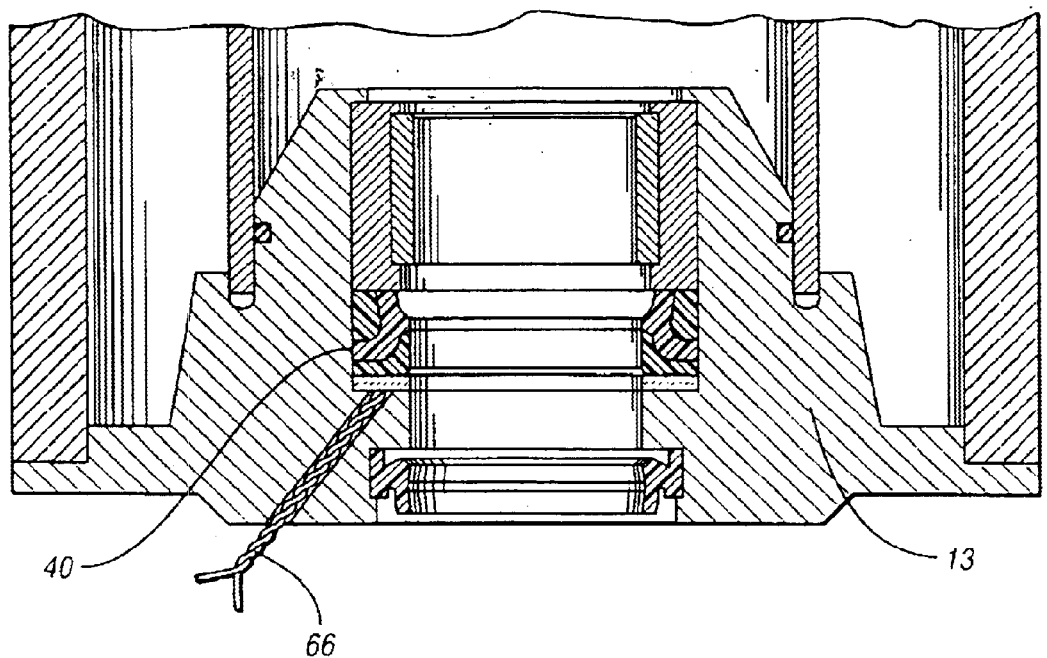
FIG. 3a is an enlarged view depicting a fluid seal assembly in circle 3 depicting the suspension strut of FIG. 2.

The present invention generally provides a fluid seal assembly of a pressured system, such as a vehicle suspension strut, for reducing static friction on a displacement rod of the pressured system. The fluid seal assembly includes a sealing member disposed on the surface of the pressured system. The sealing member is in circumferential engagement about the displacement rod to define a radial preload thereto, contributing to static friction on the displacement rod. The sealing assembly further includes an actuator attached to the sealing member. The actuator is made of an electro-active element, such as piezoelectric material, which bends the actuator when an electric input is applied thereacross. The electric input may be regulated by an electronic control unit (ECU). From a sensor, the ECU receives signals indicative of a vehicle condition. Based on the signal, the ECU applies an electric input to the actuator to displace the sealing member from the displacement rod.

In operation, at low vehicle speeds, the actuator bends to displace the sealing member from the displacement rod which reduces the static friction on the displacement rod when the displacement rod moves from a stagnant position within the pressured system. The present invention reduces harshness of the vehicle ride which is often experienced at such low vehicle speeds.

FIG. 1 illustrates a pressured system or a suspension strut 10 of a vehicle 12 for reducing static friction within the pressured system. As shown, the vehicle 12 has a wheel 14 which contacts a surface 16 under the vehicle 12 and a suspension link 18 suspending the wheel 14 from the vehicle 12. In cooperation with the suspension link 18, the suspension strut 10 allows compression movement of the wheel 14 toward the vehicle 12 and rebound movement of the wheel 14 toward the surface 16. The suspension strut 10 may be used in any suitable environment.

FIG. 2 depicts an example of the suspension strut 10 having a fluid seal assembly 11 for reduced static friction in accordance with one embodiment of the present invention. As shown, the suspension strut 10 includes a tube 20 having inner walls 22 defining a first portion or an inner cavity 23. The suspension strut 10 further includes a pressure vessel 24 disposed about the tube 20 and having outer walls 26 spaced apart from the inner walls 22 defining a second portion or an outer cavity 28. The inner walls 22 of the tube 20 has apertures 30 formed therethrough allowing the inner cavity 23 to be in fluid communication with outer cavity 28. Each of the cavities 23 and 28 are adapted to contain compressible fluid and to cooperate with the compressible fluid to supply a suspending spring force biasing the wheel 14 toward the surface 16.

As shown in FIG. 2, the suspension strut 10 further includes a displacement rod 32 and a cavity piston 33 coupled to the displacement rod 32. The tube 20 and the displacement rod 32 are adapted to couple the suspension link 18 and the vehicle 12. In this embodiment, the cavity piston 33 has first and second orifices 34 and 36 with variable restrictors. The orifices 34 and 36 are formed through compression and rebound sides 38 and 39 of the cavity piston 33 to allow the compressible fluid to pass therethrough when the displacement rod 32 moves within the inner cavity 23. The first and second orifices 34 and 36 function to allow flow of the compressible fluid between the compression side 38 and the rebound side 40 of the cavity piston 33.

In this embodiment, the cavity piston 33 is preferably securely mounted to the displacement rod 32 by a conventional fastener, but may be alternatively integrally formed with the displacement rod 32 or securely mounted by any other suitable means. The cavity piston 33 is preferably made of conventional materials and with conventional methods, but may alternatively be made from other suitable materials and other suitable methods.

As shown in FIG. 2, the cavity piston 33 extends to engage with the inner walls 22 of the tube 20, allowing flow of the compressible fluid between the inner and outer cavities 23 and 28. The displacement rod 32 and cavity piston 33 are adapted to move into the inner cavity 23 upon the compression movement of the wheel 14 and to move out of the inner cavity 23 upon the rebound movement of the wheel 14.

The compressible fluid cooperates to supply the suspending spring force and is preferably but not necessarily a silicon fluid that compresses about 1.5% volume at 2,000 pounds per square inch gauge (psig), about 3% volume at 5,000 psig, and about 6% volume at 10,000 psig. Above 2,000 psig, the compressible fluid has a larger compressibility than conventional hydraulic oil. The compressible fluid, however, may alternatively be any suitable fluid, with or without a silicon component, that provides a larger compressibility above 2,000 psig than conventional hydraulic oil.

In use, the tube 20 and the displacement rod 32 cooperatively function to couple the suspension link 18 and the vehicle 12 and to allow compression movement of the wheel 14 toward the vehicle 12 and rebound movement of the wheel 14 toward the surface 16. The inner and outer cavities 23 and 28 contain the compressible fluid and supply the suspending spring force that biases the wheel toward the surface. The suspending spring force operates to suspend the entire wheel above the surface. The displacement rod 32 is adapted to move into the inner cavity 23 upon the rebound movement of the wheel. As it moves into the inner cavity, the displacement rod displaces and compresses the compressible fluid. In this manner, the movement of the displacement rod 32 into the inner cavity 23 increases the suspending spring force of the suspension strut 10. As the displacement rod 32 moves out of the inner cavity, the compressible fluid decompresses and the suspending spring force of the suspension strut 10 decreases.

In this embodiment, the displacement rod 32 is cylindrically shaped and, because of this preference, the displacement of the displacement rod 32 within the inner cavity 23 and the magnitude of the suspending spring force have a linear relationship. However, the displacement rod 32 may be alternatively designed with another suitable shape. In this embodiment, the tube 20 and the displacement rod 32 are made of conventional steel and with conventional methods, but may be made of any suitable material with any suitable methods.

The apertures 30 formed on inner walls 22 of tube 20 function to fluidly connect the inner and outer cavities 23 and 28. In this manner, the size of the tube 20 and the size of the pressure vessel 24 may be adjusted to optimize the suspending spring force of the suspension strut 10. It is to be understood that other suspension strut mechanisms and designs may be used in the present invention without falling beyond the scope or spirit of the present invention.

Figure 3B:
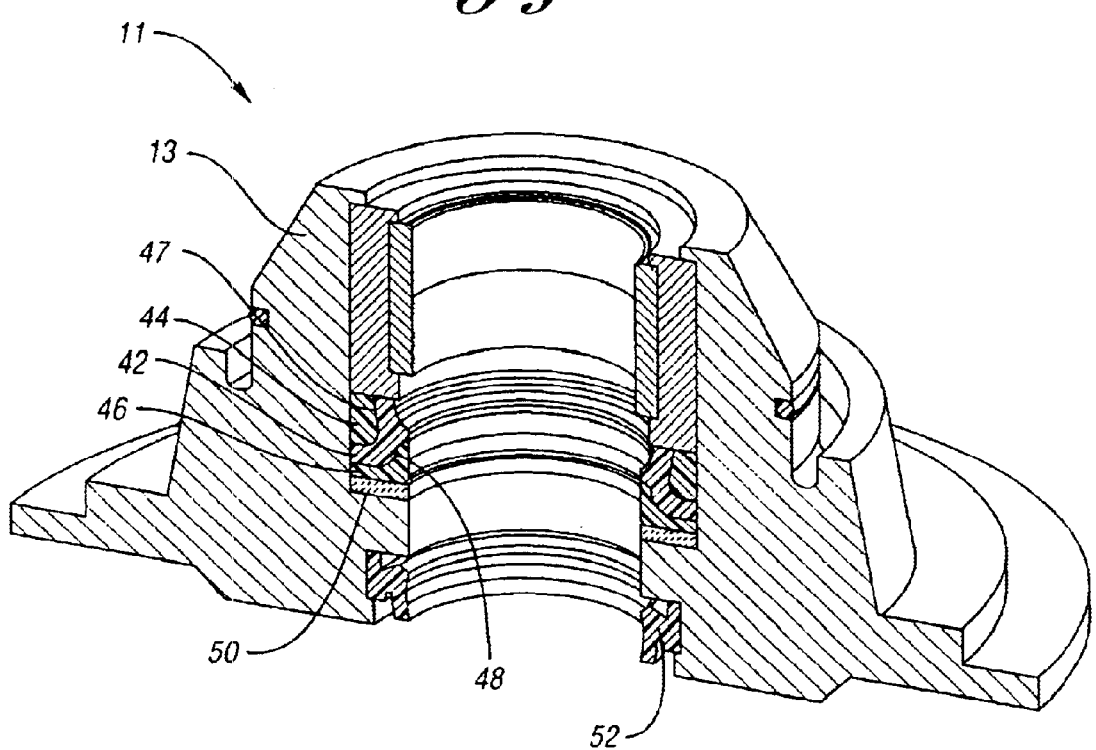
FIG. 3b is a perspective cross sectional view of the fluid seal assembly in the suspension strut.

As shown in FIGS. 3a and 3b, the suspension strut 10 further includes the fluid seal assembly 11 including a gland cap or housing portion 13 having a sealing member 40 for sealing the compressible fluid in the tube 20. The sealing member 40 is disposed adjacent the inner walls 22 of the tube 20. In this embodiment, the fluid seal assembly 11 is attached to the tube and is disposed about the displacement rod. The sealing member is disposed within a surface or walls of the housing portion and is in circumferential engagement about the displacement rod 23 to define a radial preload on the displacement rod 23 forming a static friction thereon.

In this embodiment, the sealing member 40 includes a cover member 42, a support member 44 attached to the cover member 42, and a backup member 46 attached to the cover member 42 opposite the support member 44. In this embodiment, the cover member is in circumferential engagement about the displacement rod 32. As shown, the cover member 40 has first and second sides 47 and 48. The support member 44 is engaged with the first side 47 of the cover member 40 and biases the cover member 40 against the displacement rod 32 to define the radial preload on the displacement rod 32. This contributes to the static friction thereon when the displacement rod move from a stagnant position within the tube. A stagnant position may be defined as a position at which the displacement rod has insubstantial movement relative to the tube. As shown, the backup member 46 engages with the second side 48 to provide structure and support to the cover member 42. The sealing member 40 seals the compressible fluid within the inner cavity 23 reducing fluid escape to the atmosphere.

Figure 4A:
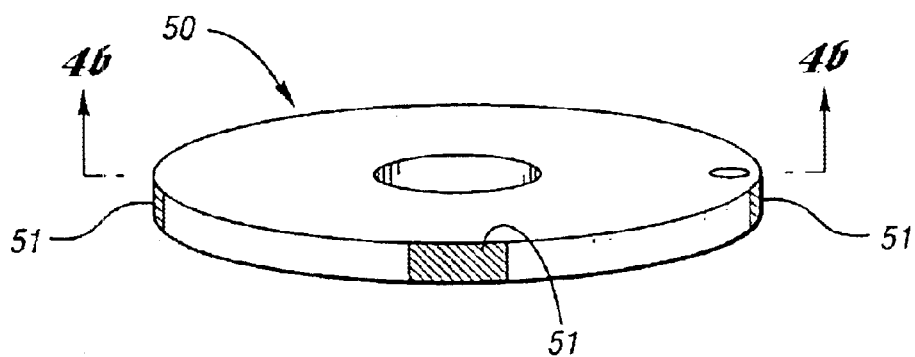
FIG. 4a is a perspective cut-away view of an actuator of the fluid seal assembly having internal and external electrodes.
Figure 4B:
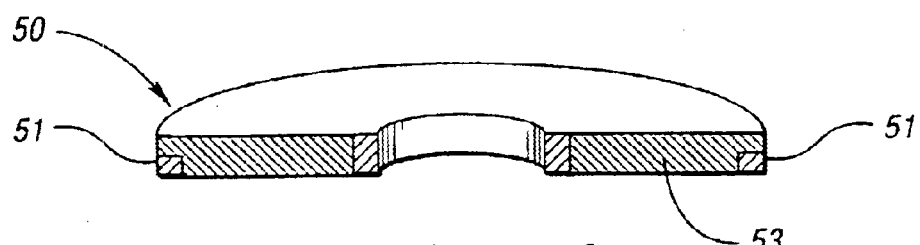
FIG. 4b is a cross-sectional view of the actuator for the fluid seal assembly in FIG. 4a taken along lines 4b—4b.
Figure 4C:
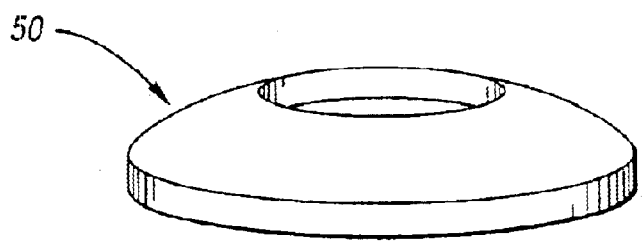
FIG. 4c is a perspective view of the actuator in an actuated position when an electric input is applied thereacross.

As shown in FIGS. 4a–4c, the suspension strut 10 further includes an actuator 50 abutting the sealing member 40. The actuator 50 is configured to bend when an electric input is applied thereacross to displace the sealing member 40 from the displacement rod. The actuator 50 is made of an electroactive material, e.g., a pieroelectric material. The displacement of the sealing member reduces the static friction on the displacement rod 32 when the displacement rod 32 moves from a stagnant position within the tube 20. As shown, gland cap or housing portion 13 attaches to the actuator 50 to provide support to the actuator 50 when the actuator bends to displace the sealing member 40 from the displacement rod 32.

In this embodiment, the actuator 50 is a piezoelectric material configured to bend when an electric input is applied across the actuator to displace the sealing member from the displacement rod for reducing the static friction on the displacement rod when the displacement rod move from a stagnant position within the pressured system. Of course, the actuator 50 may be made of any other electro-active element or material suitable to displace the sealing member from the displacement rod.

In this embodiment, the actuator is configured to displace the sealing member from the displacement rod between about 0.025 micron to 0.050 micron to reduce the static friction on the displacement rod when the displacement rod is stagnant within the pressured system. The actuator is configured to bend up to about 0.050 micron when up to about 1 KHz in frequency is applied across the actuator at about ±100 volts. The actuator is a ceramic multi-layer ring made of a plurality of piezoelectric layers having screen-printed internal electrodes extending thereabout. The ring has external electrodes in electrical communication with the internal electrode. The ceramic multi-layer ring is configured to bend when an electric input is applied thereacross to displace the sealing member from the displacement rod for reducing the static friction on the displacement rod when the displacement rod move from a stagnant position within the tube.

Figure 5:
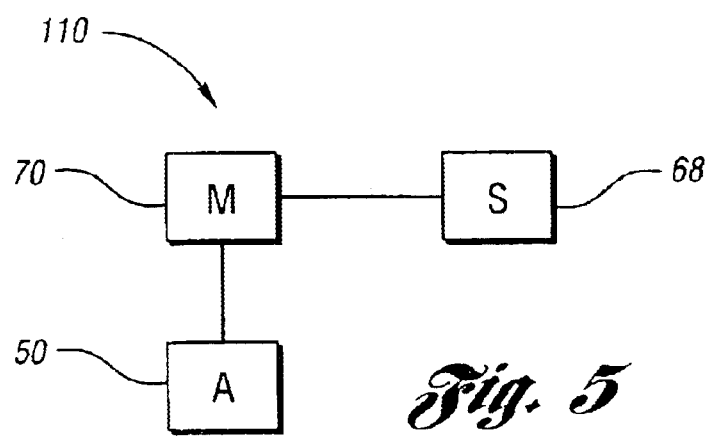
FIG. 5 is a block diagram of an actuating system for reducing static friction on a displacement rod of a suspension strut implementing the fluid seal assembly in accordance with one embodiment of the present invention.

As shown in FIG. 5, an actuating system 110 may be implemented to activate the actuator discussed above. In this embodiment, the system 110 may include wires 66 (FIG. 3a) to electrically connect the actuator 50 to an electronic control unit (ECU) 70. A vehicle sensor 68 may be in electrical communication with the ECU 70 to sense a vehicle condition and send signals indicative of such a vehicle condition. The ECU 70 receives the signal from the sensor 68 and is configured to regulate an electric input across the actuator 50 based on the signal. The electric input causes the actuator 50 to bend and displace the sealing member from the displacement rod for reducing the static friction on the displacement rod when the displacement rod is stagnant within the pressured system.

The vehicle condition may include one or a plurality of vehicle conditions including vehicle speed, vehicle acceleration, vehicle yaw rate, displacement rod compression movement, displacement rod rebound movement, vehicle tilt, or any other suitable vehicle condition. In this embodiment, one sensor is implemented in the system. Of course, a plurality of sensors may be implemented to read a plurality of vehicle conditions as desired without falling beyond the scope or spirit of the present invention.

In one embodiment, the present invention provides for a method of reducing static friction on a displacement rod of a pressured system. As discussed above, the pressured system has a sealing member disposed on a surface of the pressured system. The sealing member is in circumferential engagement about the displacement rod to define a radial preload on the displacement rod contributing to a static friction thereon. An electro-active member is in engagement with the sealing member. One method of the present invention comprises sensing a vehicle condition relative to the pressured system and determining a voltage to be applied based on the vehicle condition of the vehicle wheel. The method further includes applying an electrical input at the voltage on the actuator to bend the actuator and displace the sealing member from the displacement rod. This reduces the static friction on the displacement rod when the displacement rod is stagnant within the pressured system.

While the present invention has been described in terms of preferred embodiments, it will be understood, of course, that the invention is not limited thereto since modifications may be made to those skilled in the art, particularly in light of the foregoing teachings.

What is claimed is:

1. A suspension strut of a pressurized pressured system for a vehicle for reduced static friction on a displacement rod of the pressured system, the vehicle having a wheel contacting a surface under the vehicle and a suspension link suspending the wheel from the vehicle and allowing compression movement of the wheel toward the vehicle and rebound movement of the wheel toward the surface, the suspension strut comprising:
   a compressible fluid;
   a tube and displacement rod adapted to couple the suspension link and the vehicle, the tube including inner walls defining an inner cavity, the inner walls having apertures formed therethrough defining first and second portions of the inner cavity in fluid communication, each of the portions being adapted to contain the compressible fluid and to cooperate with the compressible fluid to supply a suspending spring force biasing the wheel toward the surface, the displacement rod adapted to move into the inner cavity upon the compression movement of the wheel and to move out of the inner cavity upon the rebound movement of the wheel;
   a cavity piston coupled to the displacement rod and extending to engage with the tube thereby allowing flow of the compressible fluid between the first and second portions of the inner cavity;
   a sealing member for sealing the compressible fluid in the tube, the sealing member being disposed on a surface of the housing portion adjacent the inner walls, the sealing member being in circumferential engagement about the displacement rod to define a radial preload on the displacement rod forming a static friction thereon;
   an actuator attached to the sealing member and being configured to bend when an electric input is applied thereacross to displace the sealing member from the displacement rod for reducing the static friction on the displacement rod when the displacement rod moves within the pressured system; and
   a gland cap attached to the actuator to provide support to the actuator when the actuator bends to displace the sealing member from the displacement rod, the gland cap being attached to the tube and disposed about the displacement rod.

2. The suspension strut of claim 1 wherein the sealing member includes:
   a cover member being in circumferential engagement about the displacement rod, the cover member having first and second sides;
   a support member being engaged with the first side of the cover member and biasing the cover member against the displacement rod to define the radial preload on the displacement rod forming the static friction thereon when the displacement rod move from a stagnant position within the pressured system; and
   a backup member engaged with the second side of the cover member for providing support to the cover member.

3. The suspension strut of claim 1 wherein the actuator is a piezoelectric material configured to bend when the electric input is applied across the actuator to displace the sealing member from the displacement rod for reducing the static friction on the displacement rod when the displacement rod moves from a stagnant position within the pressured system.

4. The suspension strut of claim 1 further comprising:
   a sensor configured to sense a vehicle condition relative to the pressured system and send a signal indicative of the vehicle condition;

an electronic control unit in electrical communication with the sensor for receiving the signal indicative of the vehicle condition, the electronic control unit configured to regulate the electric input across the actuator based on the signal to bend the actuator to displace the sealing member from the displacement rod for reducing the static friction on the displacement rod when the displacement rod moves from a stagnant position within the pressured system.

5. The suspension strut of claim 1 wherein the actuator is configured to displace the sealing member from the displacement rod between about 0.025 micron to 0.050 micron to reduce the static friction on the displacement rod when the displacement rod moves from a stagnant position within the pressured system.

6. The suspension strut of claim 1 wherein the actuator is configured to bend up to about 0.050 micron when up to about 1 KHz in frequency is applied across the actuator at about ±100 volts.

7. The suspension strut of claim 1 wherein the surface of the pressured system on which the sealing member is disposed is a gland cap surface of a gland cap assembly of the pressured system.

8. The suspension strut of claim 1 wherein the actuator is a ceramic multi-layer ring made of a plurality of piezoelectric layers having screen-printed internal electrodes extending thereabout, the ring having external electrodes in electrical communication with the internal electrodes, the ceramic multi-layer ring being configured to bend when the electric input is applied thereacross to displace the sealing member from the displacement rod for reducing the static friction on the displacement rod when the displacement of the rod is stagnant within the pressured system.

9. The suspension strut of claim 4 wherein the vehicle condition includes a vehicle speed, a vehicle acceleration, a vehicle yaw rate, a displacement rod compression movement, a displacement rod rebound movement, and a vehicle tilt.

10. The suspension strut of claim 1 wherein the actuator is in electrical communication with an electrical source.

* * * * *